US005079121A

United States Patent [19]

Facci et al.

[11] Patent Number: 5,079,121

[45] Date of Patent: Jan. 7, 1992

[54] SEAMLESS POLYMERIC BELTS FOR ELECTROPHOTOGRAPHY AND PROCESSES FOR THE PREPARATION THEREOF

[75] Inventors: John S. Facci, Webster; Huoy-Jen Yuh, Pittsford; William W. Limburg, Penfield; Santokh S. Badesha, Pittsford, all of N.Y.

[73] Assignee: Xerox Corporation, Stamford, Conn.

[21] Appl. No.: 459,395

[22] Filed: Dec. 29, 1989

[51] Int. Cl.$^5$ .............. C03G 5/10

[52] U.S. Cl. .............. 430/62; 430/69; 428/515; 427/12; 252/500

[58] Field of Search .............. 430/69, 58, 59, 62

[56] References Cited

U.S. PATENT DOCUMENTS

| | | | |
|---|---|---|---|
| 3,905,813 | 9/1975 | Wyhot | 430/69 |
| 4,282,118 | 8/1981 | Hwang | 430/69 |
| 4,416,963 | 11/1983 | Takimoto | 430/69 |
| 4,425,467 | 1/1984 | Alvino et al. | 524/600 |
| 4,474,658 | 10/1984 | Alvino et al. | 204/181 C |
| 4,533,448 | 8/1985 | Scola et al. | 204/181.7 |
| 4,547,270 | 10/1985 | Naarmann | 204/58.5 |
| 4,617,228 | 10/1986 | Newman et al. | 428/265 |
| 4,642,170 | 2/1987 | Alvino et al. | 204/181.4 |
| 4,664,768 | 5/1987 | Scala et al. | 204/181.6 |
| 4,680,236 | 7/1987 | Myers et al. | 428/515 |
| 4,697,000 | 9/1987 | Witucki et al. | 528/423 |
| 4,747,992 | 5/1988 | Sypula et al. | 264/130 |
| 4,760,105 | 7/1988 | Fuller et al. | 523/420 |

OTHER PUBLICATIONS

Journal of Polymer Science, vol. 23, 1687-1698 1985, "An Electrically Conductive Plastic Composite Derived from Polypyrrole and Poly (Vinyl Chloride),'-'DePaoli et al.

J. Chem. Soc. Chem. Commun., 1984, "Conductive Composites from Poly(Vinyl Chloride) and Polypyrrole", pp. 1015-1016, DePaoli et al.

Xerox Disclosure Journal, vol. 14, No. 2, Mar./Apr. 1989, "Seamless Conductive Substrates for Electrophotographic Applications", Limburg et al.

*Primary Examiner*—David Welsh
*Attorney, Agent, or Firm*—430; 62; Judith L. Byorick

[57] ABSTRACT

Disclosed is a seamless belt comprising a laminate of a conducting polymer layer and a host polymer layer. The process for preparing the seamless belt comprises electrochemically polymerizing onto an electrode a layer of a conductive polymeric material, followed by electrophoretically depositing a layer of a host polymer onto the layer of conductive polymeric material. Also disclosed is an imaging member comprising a substrate and a photogenerating layer, wherein the substrate comprises a laminate as described above. An imaging process which comprises incorporating into an ionographic imaging device an imaging member comprising a laminate of a conducting polymer layer and a host polymer layer as described above, generating a latent image on the imaging member by ion deposition, developing the latent image with a toner, transferring the developed image to a substrate, and permanently affixing the transferred image to the substrate is also disclosed.

19 Claims, No Drawings

SEAMLESS POLYMERIC BELTS FOR ELECTROPHOTOGRAPHY AND PROCESSES FOR THE PREPARATION THEREOF

BACKGROUND OF THE INVENTION

The present invention is directed to seamless polymeric belts and to a process for preparing such belts. More specifically, the present invention is directed to seamless belts comprising a laminate of a host polymer and a conducting polymer, and to processes for preparing these belts by the electrochemical deposition of a conducting polymer and the electrophoretic deposition of a host polymer from a a dispersion or emulsion onto an electrode. The present invention is also directed to electrophotographic and ionographic imaging members containing these seamless belts, and to imaging processes employing these members. One advantage of the betls of the present invention is the separation of the electronic conductivity properties and the physical and mechanical properties to the belt as a result of the two different polymers, thereby permitting independent optimization of both characteristics.

Imaging members for electrophotographic imaging systems comprising selenium alloys vacuum deposited on rigid aluminum substrates are known. These imaging members require elaborate, highly sophisticated, and expensive equipment for fabrication. Imaging mumbers have also been prepared by coating rigid substrates with photoconductive particles dispersed in an organic film forming binder. Coating of rigid drum substrates has been effected by various techniques such as spraying, dip coating, vacuum evaporation, and the like. Rigid drum imaging members, however, limit apparatus design flexibility, are less desirable for flash exposure, and are expensive. Flexible organic imaging members are manufactured by coating a web and thereafter shearing the web into segments which are then formed into belts by welding opposite ends of the sheared web. The resulting welded seam on the imaging member, however, disrupts the continuity of the outer surface of the imaging member and must be indexed so that it does not print out during an imaging cycle. Efficient stream feeding of paper and throughput are thus adversely affected because of the necessity to detect a seam within the length of each sheet of paper. The mechanical and optical devices required for indexing add to the complexity and the cost of copiers, duplicators, and printers, and reduce the flexibility of design. Welded belts are also less desirable for electrophotographic imaging systems because the seam forms a weak point in the belt and collects toner and paper debris during cleaning, particularly with wiper blade cleaning devices.

Accordingly, seamless belts suitable as substrates for electrophotographic or ionographic imaging members are particularly desirable. In addition, seamless belts exhibiting conductivity are particularly desirable as substrates for electrophotographic or ionographic imaging members because the conductive portion of the substrate can function as a ground plane in an imaging member. The present invention provides seamless belts exhibiting conductivity on one surface; these belts are suitable substrates for imaging members. In addition, the seamless belts of the present invention are suitable image receptors for ionographic imaging proceses, wherein a latent image is formed on a dielectric image receptor by ion deposition, as described in U.S. Pat. Nos. 4,524,371 and 4,463,363, the disclosures of which are totally incorporated herein by reference.

One layer of the seamless belts of the present invention is prepared by electrochemical deposition of a conducting polymer onto an electrode. An electrochemical polymerization process for polymerization of pyrroles, which are conductive, is disclosed U.S. Pat. No. 4,547,270, the disclosure of which is totally incorporated herein by reference. This reference discloses a process wherein pyrroles or mixtures of pyrroles with comonomers are polymerized electrochemically by anodic oxidation of the monomers in solution or dispersion in an electrolyte solvent, in the presence of a conductive salt, with deposition of the pyrrole polymer at the anode. The anode used consists of an electrically non-conductive sheet-like element which can be impregnated with the electrolyte solution and one or more electrically conducting support and contact strips which connects electrically to a current supply for the anode.

In addition, U.S. Pat. No. 4,680,236 discloses an electrodeless heterogeneous polypyrrole composite which consists of a host polymer and polypyrrole deposited on and within the host polymer. An insulating polymer is at least partially impregnated with sufficient pyrrole monomer to become conductive after the monomer is polymerized. The polymerization is a chemical oxidative polymerization ("dip-polymerization") which, if carried out under anhydrous conditions, transforms the insulating polymer into a semiconductive composite consisting essentially of the host polymer containing a first species of conductive polypyrrole and a Group VIII metal halide counterion. Thereafter, the semiconductive composite containing the counterion is used to electrodeposition it a second species of conductive polypyrrole. The composite with the two species of polypyrrole and anions is used in applications wherein a lightweight organic resistance heating element is desired.

Further, U.S. No. 4,617,228 discloses a process for producing electrically conductive composites. An electrically conductive composite comprising a dielectric porous substance and a pyrrole polymer in the pores of the substance is prepared by treating the porous substance with a liquid pyrrole, and then treating the resulting porous substance with a solution of a strong oxidant in the presence of a non-nucleophilic anion. The pyrrole monomer is oxidized to a pyrrole polymer, which precipitates in the interstices of the porous material. Alternatively, the dielectric porous material can first be treated with a solution of strong oxidant and nonnucleophilic anion followed by treatment with liquid pyrrole, to preciptate an electrcially conductive polypyrrole in the pores of the material. The resulting composite the porous material containing polypyrrole is electrically conductive while the other properties of the porous material are substantially unaffected.

Additionally, U.S. Pat. No. 4,697,000 discloses a process for producing electrically conduvtive polypyrrole powder by treating a liquid pyrrole with a solution of a strong oxidant capable of oxidizing pyrrole to a pyrrole polymer, and oxidizing the pyrrole by the oxidant in the presence of a substantially non-nucleophilic anion and precipitating a conductive polypyrrole powder. The strong oxidant and non-nucleophilic anion can be derived from a single compound. The anion serves as a dopant for the polypyrrole. The reaction can be carried out in aqueous solution or in an organic solvent medium.

The host polymer layer of the belts of the present invention is prepared by electrophoretic deposition of the host polymer onto an electrode. U.S. Pat. No. 4,760,105, the disclosure of which is totally incorporated herein by reference, disclosed an emulsion having a discontinuous phase that consists of a water dispersed or water emulsified epoxy resin in water having at least two epoxide groups, a water soluble salt of an imide compound having at least one carboxyl group, and a crosslinking agent; the discontinuous phase has excess epoxide functionality. The continuous phase is water. A method of forming a coating on a conductive substrate is also disclosed in this patent. The substrate and an electrode are immersed into the emulsion and a direct current is applied between the substrate and the electrode to deposit electrophoretically a coating on the substrate of the epoxy resin, the imide compound, and the crosslinking agent. The substrate is removed from the emulsion and is heated to a temperature sufficient to cure the coating.

In addition, U.S. Pat. No. 4,664,768, the disclosure of which is totally incorporated herein by reference, discloses a method of making a laminate by electrophoretically coating a flat mat made from a material selected from graphite, carbon, and mixtures thereof with an electrophoretable polymer in a non-aqueous system. The polymer is cured and the mat is impregnated with a thermosetable resin. The impregnating resin is B-staged to form a prepreg and several prepregs are stacked and cured under heat and pressure to form the laminate.

Further, U.S. Pat. No. 4,642,170, the disclosure of which is totally incorporated herein by reference, discloses a method of electrophoretically depositing a coating of polysulfones or polyethersulfones on a conductive substrate. An amine-free solution is formed in an organic solvent of the polysulfones or polyethersulfons. Subsequently, an emulsion is formed by combining the solution with an organic non-solvent for the polymer which contains up to about 0.6 parts by weight of an organic nitrogen containing base per parts by weight of the polymer. A direct current is then applied between a conductive substrate and the emulsion, which results in the deposition of the polymer on the substrate.

Additionally, U.S. Pat. No. 4,533,448, the disclosure of which is totally incorporated herein by reference, discloses an electrodepositable emulsion which comprises a soluble un-ionized polymer containing an amic acid or amide linking group, a non-electrolyzable organic solvent for the polymer, and a non-electrolyzable organic non-solvent for the polymer The weight ratio of the solvent to the non-solvent is about 0.1 to about 0.5 and the polymer is about 0.4 to about 5% by weight of the weight of the solvent. No amine or surface active agent is used. A workpiece is coated with the polymer by placing it into the emulsion about one-half to about two inches away from the cathode. Constant dc voltage is applied between the cathode and the workpiece until a coating of a desired thickness has been deposited on the workpiece. The workpiece is then removed, dried, and cured.

Further, U.S. Pat. No. 4,474,658, the disclosure of which is totally incorporated herein by reference, discloses a method of making a non-aqueous emulsion from which a polymer can be electrodeposited. A mixture is prepared of about 50 to about 150 parts by weight of a non-aqueous organic, non-electrolyzable, non-solvent for the polymer with about 0.8 to about 1.2 parts by weight of a nitrogen-containing base which can be a tertiary amine, an imidazole, or mixture of a tertiary amine and an imidazole. To the mixture is added a solution of 1 part by weight of the polymer, which can be a polyamic acid, a polyamide imide, a polyimide, a polyparabanic acid, a polysulfone, or a mixture of these polymers. The polymer is in a non-aqueous, organic, non-electrolyzable aprotic solvent such as N-methyl-2-pyrrolidone.

In addition, U.S. Pat. No. 4,425,467, the diclosure of which is totally incorporated herein by reference, discloses a method of making a non-aqueous emulsion from which a polymer can be electrodeposited. A mixture is prepared of about 50 to about 150 parts by weight of a non-aqueous organic, non-electrolyzable, non-solvent for the polymer with about 0.8 to about 1.2 parts by weight of a nitrogen-containing base which can be a tertiary amine, an imidazole, or mixture of a tertiary amine and an imidazole. To the mixture is added a solution of 1 party by weight of the polymer which can be a polyamic acid, a polyamide imide, a polyimide, a polyparabanic acid, a polysulfone, or a mixture of these polymers. The polymer is in a non-aqueous, organic, non-electrolyzable aprotic solvent such as N-methyl-2-pyrrolidone.

U.S. Pat. No. 4,747,992 discloses a process for forming at least one thin, substantially uniform fluid coating comprising polymeric film forming material on a cylindrical mandrel, solidifying the fluid coating to form a uniform solid coating, and separating the uniform solid coating from the mandrel. The coating thus formed can be used as seamless belt substrates in electrophotographic imaging members.

In addition, "An Electrically Conductive Plastic Composite Derived from Polypyrrole and Poly(vinyl Chloride)", M. De Paoli et al., *Journal of Polymer Science*, Vol 23, pages 1687 to 1698 (1985), the disclosure of which is totally incorporated herein by reference, discloses a process for obtaining an electrically conductive plastic material by the electrochemical polymerization of pyrrole in a poly(vinyl chloride) matrix to form a composite wherein the polypyrrole is uniformly distributed in the poly(vinyl chloride) matrix. Further, "Conductive Composites from Poly(vinyl chloride) and Polypyrrole", M. De Paoli et al., *J. Chem. Soc., Chem. Commun.*, pages 1015 and 1016 (1984), the disclosure of which is totally incorporated herein by reference, discloses process that entails the electrochemical polymerization of pyrrole on a platinum electrode covered with a film of poly(vinyl chloride) to produce a composite polymer film.

William W. Limburg, Santokh S. Badesha, and John S. Facci in "Seamless Conductive Substrate for Electrophotographic Applications," Xerox Disclosure Journal, Vol. 14, No. 2 (1989), disclose a conductive substrate comprising an interpenetrating polymer network comprising an electronically conductive polypyrrole in a host polymer such as polyvinyl chloride. The interpenetrating network can be prepared by depositing the host polymer on a cylindrical metallic electrode by electrostatic powder or solvent spray processes, followed by immersing the host polymer and the conductive mandrel in a bath containing a solution of pyrrole in an electrolyte solution and anodically electropolymerizing the pyrrole to deposit conductive polypyrrole throughout the void areas of the host polymer. Alternatively, the pyrrole swelled host polymer can be contated with diethyl selenite to cause the pyrrole to polymerize oxidatively to polypyrrole on contact. Further, an interpenetrating network of polypyrrole can be created by diffusing separated solutions of diethyl selenite and pyrrole in a swelling solvent into the host polymer from opposite sides of the film so that oxidative chemical polymerization of pyrrole occurs within the host polymer where the separated solutions intersect.

While the above described materials and processes are useful for their intended purposes, there continues to be a need for improved, flexible, free standing conductive polymeric films, and more particularly, for seamless belts for various applications, including substrates for electrostatic and ionographic imaging members. There is also a need for conductive seamless belts wherein the function of conductivity and the function of support, which is derived from polymer properties such as flexibility, tensile strength, and elongation modulus, are separated, thereby allowing for independent optimization of the conductivity and the physical properties of the belt.

SUMMARY OF THE INVENTION

It is an object of the present invention to provide improved flexible, free standing polymeric seamless belts.

It is another object of the present invention to provide seamless belts which are optically non-dispersive and transparent and which exhibit sufficient conductivity to be useful as electrophotographic ground planes.

It is still another object of the present invention to provide processes for preparing conductive polymeric seamless belts wherein sagging during deposition is avoided.

It is yet another object of the present invention to provide processes for perparing polymeric seamless belts which avoid the need for extensive processing and equipment space.

Another object of the present invention resides in the provision of processes for preparing polymeric seamless belts which are readily removed from an electrode.

Yet anther object of the present invention resides in the provision of flexible seamless belts which avoid the need for seam detection devices in imaging systems.

Still another object of the present invention resides in the provision of flexible seamless belts which allow greater throughput of documents in imaging systems for higher productivity.

Another object of the present invention is to provide a seamless belt comprising a conductive polymer/host polymer laminate wherein the functions of electronic conductivity and polymer physical properties are separated, thereby allowing the choice of polymer properties such as creep, compliance, tensile strength, and the like, to be made independently of the electronic properties of the polymer, thus expanding the scope of the choice of materials.

It is another object of the present invention to provide a method for preparing flexible transparent conductive seamless belts comprising laminates of a conductive polymer and a host polymer by a process wherein the two layers can both be formed by electrodeposition techniques.

These and other objects of the present invention are achieved by providing a seamless belt comprising a laminate of a conducting polymer and a host polymer, wherein at least one surface of the belt exhibits a resistivity of from about $10^2$ to about $10^6$ ohms per square ($\Omega/\square$), with preferred resistivities being less than or equal to about $10^5$ $\Omega/\square$. The seamless belts of the present invention may be prepared by a process which comprises (1) preparing a solution comprising a nonaqueous solvent, an electrolyte, and monomers that will, upon polymerization, result in a conductive polymer; (2) adding the solution to a cell containing a working electrode, a counterelectrode, and a reference electrode; (3) effecting anodic oxidation and polymerization of the monomers by applying a potential to the working electrode and counterelectrode until a layer of conductive polymeric material has been deposited on the working electrode; (4) preparing a dispersion comprising a liquid dispersion medium and a host polymer capable of becoming electrostatically charged in the liquid dispersion medium; (5) adding the dispersion to a cell comprising a working electrode upon which has been electrochemically deposited a layer of a conductive polymer and a counterelectrode; (6) effecting electrophoretic deposition of the host polymer onto the working electrode by applying a potential difference to the working electrode and counterelectrode until a layer of the host polymer has been deposited on the conductive polymer present on the working electrode; (7) subsequently heating the working electrode, resulting in formation of a two-layer laminate; and (8) separating the laminate from the working electrode. In addition, the present invention encompases an imaging member comprising a substrate and a photogenerating layer, wherein the substrate comprises a laminate of a conducting polymer and a host polymer, wherein the surface of the laminate in contact with the photogenerating layer exhibits a conductivity of from about $10^2$ to about $10^6$ ohms per square. Further, the present invention includes a process for generating images which comprises incorporating into an ionographic imaging device an imaging member comprising a laminate of a conducting polymer and a host polymer, wherein at least one surface of the belt exhibits a conductivity of from about $10^2$ to about $10^6$ ohms per square; generating a latent image on the imaging member by ion deposition; developing the latent image with a toner; transferring the developed image to a substrate; and permanently affixing the transferred image to the substrate.

The term "laminate" as applied to the present invention indicates a structure with distinct, discrete layers. Seamless belts of the present invention exhibit a distinct advantage in that the conductive polymer/host polymer laminate enables separation of the functions of electronic conductivity from the physical properties of the host polymer. Separation of these functions allows for the choice of the desired polymer properties, such as creep, compliance, tensile strength, and the like, to be made independently of the electronic properties of the host polymer, thereby greatly expanding the scope of the choice of materials for the seamless belts of the present invention. For example, many conductive polymers form brittle or otherwise poor free-standing films. Laminates of a conductive polymer and a host polymer can retain the excellent physical properties of the host polymer and the conductivity of the conductive polymer. Further, fabrication of a conductive seamless transparent laminate can be done entirely by electrochemical techniques, which results in significant cost, hardware, and space savings. Additionally, the seamless belts of the present invention are semitransparent, which enables formation of imaging members from which residual charge can be erased from the back or bottom side. By having the capability of being erased from the back, an imaging member can result in significant space savings in an imaging device, since the erase lamp can be located inside the belt instead of near the outside surface.

Seamless belts of the present invention may be prepared by depositing the conducting polymer on an electrode by electroanodic or electrochemical deposition from solution sequentially with the electrophoretic deposition of the host polymer from an emulsion or dispersion. The electrodeposition of the conducting polymer is effected by anodic oxidation of the monomeric precursor at the anode in an electrolyte solution containing the monomeric precursor. For example, if the conducting polymer is poly(pyrrole), the pyrrole monomers can be anodically oxidized as follows:

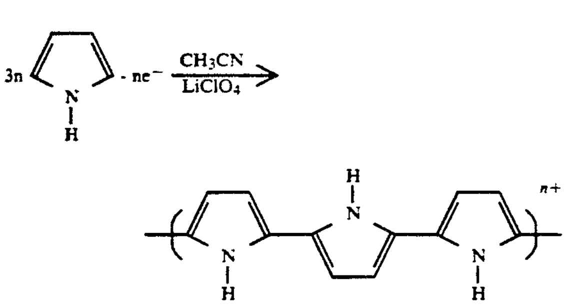

Upon oxidation, the monomer polymerizes and deposits on the electrode because of its insolubility. The resulting polymeric deposit is electronically conducting.

The host polymer is electrophoretically deposited upon the anodic electrode by forming a dispersion or emulsion of electrically charged host polymer particles in an organic liquid and applying an electric field across the electrodes until a deposit of the polymer particles forms on the electrode.

According to one method of making the seamless belts of the present invention, a thin layer of the conducting polymer is first electrochemically deposited on the electrode, followed by electrophoretic deposition of the host polymer emulsion onto the electrode. Subsequent heating of the electrode causes coalescence of the host polymer particles and results in a transparent, seamless polymer laminate with a conductive face.

The conductive polymers of the belts of present invention are deposited onto the electrode by an electrochemical deposition process. This process generally entails the use of a conventional three-electrode cell wherein the working electrode is a seamless cylindrical mandrel. The mandrel may be either solid or hollow, and, if hollow, electrodeposition may take place either on the inside surface or the outside surface of the cylinder. When deposition is desired on the inside surface of a hollow working electrode, the counterelectrode is generally also a seamless cylindrical mandrel sleeve of smaller diameter than the working electrode so that the cylinder of the counterelectrode fits concentrically inside the cylinder of the working electrode. When deposition is desired on the outside surface of a cylindrical electrode, the working electrode (anode) is a seamless cylinder of a material such as nickel and the counterelectrode is a cylindrical sleeve of a material such as nickel that is of larger diameter than the working electrode and is placed concentrically around the working electrode. The reference electrode is a standard saturated calomel electrode (SCE), saturated sodium calomel electrode (SSCE), or the like. The reference electrode is placed in the annular space between the working and counterelectrodes, preferably nearer to the working electrode. The separation between the working and counterelectrodes may be any reasonable distance, and preferably is from about 1 to about 10 centimeters.

Any suitable material having electrically conductive outer surfaces may be used for the counterelectrode and for the working electrode upon which the polymeric components of the belts of the present invention are deposited. The electrode should be dimensionally and thermally stable at the processing temperatures utilized and should be insoluble in the organic liquids employed in the electrodeposition processes of the present invention and should not react chemically with host polymer particles, the conductive polymer, or other components of the dispersion mixture. Typical electrode materials include metals such as stainless steel, nickel, chromium, brass, platinum, and the like. Typical ceramic electrode materials include ceramic, glass, and the like coated with an electrically conductive coating. The electrode may be formed by extrusion, molding, blow molding, injection molding, casting and the like to achieve the desired shape. Preferred electrodes are electroformed nickel mandrel sleeves prepared by electrodeposition of nickel from a nickel containing bath.

The electrode is generally cylindrical in shape and may be hollow or solid. The electrode surface on which the polymers deposit functions as a molding surface for either the inner (polymers applied to the outer surface of a solid or hollow electrode) or outer surface (polymers applied to the inner surface of a hollow electrode) of a belt loop formed by the process of this invention. In other words, the particles may be deposited on either the outside surface of cylindrical electrodes or the inside surface of hollow cylindrical electrodes.

Optionally, a release agent may be applied to the electrode surface prior to deposition of the layers that form the seamless belt. Typical release materials include silicones (e.g. E-155 silicone release coating and SWS F-544 cured with F-546 catalyst, both available from SWS Silicones and Dow Corning 20, available from Dow Corning Corporation); and the like.

When release coatings are employed, the release coatings are preferably applied to a clean electrode surface. Conventional industrial procedures such as metal polishing followed by chemical washing, solvent cleaning and degreasing of the electrode prior to application of the release coating may be utilized. Depending upon the initial condition of the electrode surface, it may be desirable to remove dirt, rust, mill scale, paint, oil and the like. Typical coating techniques include dip coating, spray coating, brush coating, and the like.

Instead of treating a working electrode with a release agent, the nickel electrode may be treated prior to deposition of the conductive polymer by soaking it for about ½ hour in a 50:50 mixture of hydrogen peroxide and ammonium hydroxide. Prior to electrodeposition, the electrodes may also be subjected to abrasion with, for example, grit paper, steel wool, diamond paste, or the like.

To effect electrochemical deposition of the conductive polymer, the corresponding monomer is dissolved in a suitable solvent, which generally is a nonaqueous anhydrous polar aprotic solvent. Prior to dissolution, the monomer may be purified by, for example, passing it through an alumina chromatography column. Examples of suitable solvents include anhydrous acetonitrile, dimethylformamide, dimethylsulfoxide, butyronitrile, benzonitrile, dimethoxyethane, N-methylpyrrolidinone, and the like, and mixtures thereof. The monomer is dissolved in the solvent at a concentration of from about 1 millimolar to about 0.3 Molar, preferably from about 0.1 to about 0.3 Molar. The solution also contains an electrolyte, generally in a concentration of from about 0.05 Molar to about 1 Molar, preferably from about 0.5 to about 1.0 Molar. Suitable electrolytes include ionic compounds wherein the cation is selected from moieties such as sodium, lithium, potassium, tetraphenyl arsenic, tetraalkyl ammonium wherein the alkyl groups have from 1 to about 4 carbon atoms, and the like, and the anion is nonnucleophilic and is selected from moieties such as antimony hexafluoride, arsenic hexafluoride, tetraphenylborate, phosphorus hexafluoride, perchlorate, and the like. Thus, examples of suitable electrolytes include tetraethyl ammonium perchlorate, sodium perchlorate, lithium perchlorate, and the like.

Polymerization occurs at a potentiostatically constant voltage of from about 0.75 to about 1.5 volts vs. SCE is applied to the cell, which usually results in a current of about 1 to 2 milliamperes per square centimeter. The conductive polymer undergoes anodic interfacial electrodeposition and is deposited at the anode. Voltage is applied until the desired thickness of the conductive polymer has been deposited on the working electrode. Desirable thicknesses for the conductive polymer layer when the formation of a substrate for an electrophotographic or ionographic imaging member is intended are generally from about 200 Ångstroms to about 1 micron, and preferably from about 1,000 Ångstroms to about 2,000 Ångstroms. Typically, voltage is applied for from about 1 to about 10 minutes to obtain the desired thickness. In some instances it may be convenient to correlate thickness to the amount of charge consumed at the working electrode, since charge consumed (Q) is the product of current (i) and time (t).

$$Q=it$$

Layer thicknesses and charge consumed may be determined experimentally for the individual system in use. For example, a layer 2,500 Ångstroms thick may correspond to a charge consumption of about 0.25 coulombs per square centimeter. As the concentration increases, the deposition rate increases, and a shorter time is required to achieve the desired thickness.

Examples of suitable conducting polymers for the seamless belts of the present invention include poly(heterolenes) such as poly(pyrrole), poly (N-alkyl) pyrroles such as poly(N-methylpyrrole), poly(2,5-thienylene), polyalkylthienylenes such as poly(3-methyl-2,5-thienylene), poly(2,2'-bithiophene), polyaniline, similar heterocyclic conducting polymers, and the like.

Additional details concerning the process of electrochemically polymerizing materials such as polypyrroles are contained in U.S. Pat. No. 4,547,270, the disclosure of which is totally incorporated herein by reference.

Subsequent to deposition of the conductive polymer layer, the counterelectrode and the working electrode with the deposited layer are rinsed to remove excess solvent and electrolyte. Typically, the counterelectrode and the working electrode bearing the conductive layer are rinsed first with the solvent employed during the electrochemical deposition process, followed by rinsing with another solvent, such as ethanol. The working and counterelectrodes are then incorporated into a conventional two-electrode cell, which is essentially the same as the three-electrode cell described for the electrochemical deposition of the conductive layer but with no reference electrode. The layer of conductive polymer present on the working electrode is sufficiently conductive to permit subsequent electrophoretic deposition of a layer of the host polymer onto the electrode by the following process.

The host polymer is dispersed in a suitable liquid dispersion medium. Suitable liquid dispersion media generally are determined for each polymer, and are those that disperse the polymer into small particles, rather than precipitating the polymer into a large amorphous mass. The liquid dispersion medium is also generally one that results in the polymer becoming electrostatically charged upon being dispersed in the liquid. The concentration of the host polymer in the liquid dispersion medium is generally from about 0.1 to about 2 percent by weight, with the upper end of the range being preferred. Suitable liquid dispersion media include solvent/non-solvent combinations of materials such as propylene carbonate, dimethylsulfoxide, N-alkylpyrrolidones such as N-methylpyrrolidone, dialkylformamides such as dimethyl formamide, dialkylacetamides such as dimethylacetamide, N-alkyl formamides such as N-methylformamide, N-alkylacetamides such as N-methylacetamide, acetone, alkyl ketones such as methylethylketone and methylisobutylketone, alkylnitriles such as acetonitrile, propionitrile, and butyronitrile, and the like. For example, when the host polymer is polyvinyl fluoride or polyvinylidene fluoride, the preferred liquid dispersion medium is propylene carbonate. For host polymers such as poly(amide-imide) and polyimide, preferred liquid dispersion media comprise a solvent such as dimethylsulfoxide and amine containing solvents, such as N-methylpyrrolidone, dimethylformamide, dimethylacetamide, N-methylformamide, N-methylacetamide, and the like, and a non-solvent such as acetone, methylethylketone, methylisobutylketone, acetonitrile, propionitrile, butyronitrile, and the like. When the host polymer has been added to the solvent, a dispersion is formed by adding the mixture to a suitable non-solvent. Suitable non-solvents are liquids in which the polymer is not soluble but which are miscible with the liquid dispersion medium, and include materials such as aliphatic nitriles and ketones. Addition of the non-solvent in an amount of from about 21 to about 33 volume percent, preferably about 28 volume percent, results in formation of a dispersion of particles of the host polymer in the liquid dispersion medium in a concentration of from about 0.1 to about 1 percent by weight, preferably about 1 percent by weight. Addition of the polymer to the liquid dispersion medium results in the polymer becoming charged.

The host polymer dispersion is then added to the cell and voltage is applied across the electrodes. Whether to charge the working electrode positively (anode) or negatively (cathode) depends on the individual host polymer selected. For example, polyvinylfluoride will deposit at the cathode, so the working electrode is charged negatively when this polymer is employed. Polyvinylidene fluoride, on the other hand, will deposit at the anode, so the working electrode is charged positively to deposit this polymer. Polyimides and poly(amideimides) also deposit at the anode. Generally, relatively low current densities of from about 20 to about 90 microamperes per square centimeter are applied. Applied voltages are generally from about 10 to about 150 volts, and preferably from about 10 to about 50 volts. Voltage is applied until a layer of the host polymer of the desired thickness has been deposited. Desirable dry film thicknesses for the host polymer layer when the formation of a substrate for an electrophotographic or ionographic imaging member is intended are generally from about 1 mil to about 4 mils, preferably from about 2 mils to about 3 mils. Typical times are from about 10 minutes to about 35 minutes. Often, deposition rates are about 1/5 mil per minute, but the deposition rate is not linear for the duration of the process in that deposition slows down with increasing time due to the insulating effect of the deposited host polymer layer.

Suitable host polymers include chloro, bromo or fluoro substituted polyvinyl compounds such as polyvinyl fluoride, polyvinylidene fluoride (e.g. available from Pennwalt Corporation), and polyvinyl chloride; polycarbonates (e.g. Makrolon 5705, available from Bayer Chemical Company, Merlon M39, available from Mobay Chemical Company, Lexan 145, available from General Electric Company); polyesters (e.g. PE-100 and PE-200, available from Goodyear Tire and Rubber Company), polyarylates, polyarylsulfones, polyether sulfones, polyimides, epoxies, poly(amide-imides), including Torlon 4000TF and Torlon 4000 T10 from Amoco Chemical Company, copolyesters (Kodar Copolyester PETG 6763 available from Eastman Kodak Company) polyarylethers, and the like and mixtures thereof. Polycarbonate polymers may be made, for example, from 2,2-bis(4-hydroxyphenol)propane, 4,4'-dihydroxy-diphenyl-1,1-ethane, 4,4'-dihydroxy-diphenyl-1,1-isobutane, 4,4'-dihydroxy-diphenyl-4,4-heptane, 4,4'-dihydroxy-diphenyl-2,2-hexane, 4,4'-dihydroxy-triphenyl-2,2,2-ethane, 4,4'-dihydroxy-diphenyl-1,1-cyclohexane, 4,4'-dihydroxy-diphenyl-$\beta$-$\beta$-decahydronaphthalene, cyclopentane derivatives of 4,4'-dihydroxy-diphenyl-$\beta$-$\beta$-decahydronaphthalene, 4,4'-dihydroxy-diphenyl-sulphone, and the like and mixtures thereof. Suitable host polymers are generally capable of forming a dispersion or emulsion of electrically charged, thermoplastic film forming polymer particles in an organic liquid dispersion medium. The expression "dispersion" as used herein is defined as the division of a material into fine particles of generally less than about 100 microns in diameter and the distribution of these particles in a liquid medium such that there is no direct contact between the particles. Particularly preferred are poly(vinyl fluoride), poly(vinylidene fluoride), polyimides, poly(amide-imides), and epoxies.

After acquiring an electrostatic charge, the host polymer particles should also be capable of migrating through the organic liquid medium of the dispersion under the influence of an electric field to form a uniform particulate coating on an electrode. Thus, the host polymer particles should have an electrical resistivity of at least about $10^5$ ohm-cm. In addition, the host polymer particles should be capable of coalescing to form a continuous film after deposition on an electrode. If desired, the host polymer particles may be only partially polymerized and may be subsequently cured when the particulate coating on the mandrel is heated to coalesce the particles to form a continuous film and to evaporate the organic liquid. Typical examples of curable film forming polymer materials include prepolymers of polyimide, poly(amide-imide), polyurethanes, epoxy, polyesters, acrylics, alkyds, and the like. Generally, the host polymer particles in the dispersions have an average particle size between about 0.01 microns and about 10 microns to remain in dispersion for practical periods of time.

Further details regarding the process of electrophoretic deposition of polymers from a dispersion are contained in U.S. Pat. Nos. 4,760,105; 4,664,768; 4,642,170; 4,533,448; 4,474,658 and 4,425,467, the disclosures of each of which are totally incorporated herein by reference.

Subsequent to electrophoretic deposition of the host polymer on the working electrode, the resulting laminate is cured by heating the electrode. The details of the heating process are generally determined for each individual host polymer, and are such that a smooth, uniform, film free of defects such as bubbles, dimples, runs, pinholes, and the like is formed. Heating times generally range from about 20 to about 90 minutes, and preferred drying temperatures generally range from about 160° to about 280° C. For example, when the host polymer is polyvinylfluoride or polyvinylidene fluoride, the working electrode is heated in a closed atmosphere in an oven for about 5 minutes at about 180° C. By closed atmosphere is meant an atmosphere of the liquid dispersion medium vapors. For instance, when the working electrode is a hollow cylinder wherein deposition was on the inner surface, covering the top of the electrode with a plate and placing it in an oven results in heating of the laminate in a closed atmosphere. Subsequent to heating in a closed atmosphere, laminates wherein the host polymer is polyvinylfluoride or polyvinylidene fluoride are heated for about 15 minutes in an oven at about 180° C. in an open atmosphere, which can generally be achieved by removing the covering from the electrode. When the host polymer is poly(amide-imide), the resulting laminate is heated in an open atmosphere for about 5 to about 10 minutes at from about 70° C. to about 100° C., and is subsequently heated in an open atmosphere for about 1 hour at from about 180° C. to about 190° C. The belt thus formed can then be released from the working electrode.

Seamless belts of the present invention are suitable for use as conductive substrates in electrophotographic imaging members. Additional layers may be added to the belts of the present invention to prepare such members after removal of the belt from the electrode. These layers, generally applied to the conductive surface of the belt, may comprise a blocking layer, an adhesive layer, a photoconductive layer or a combination of these layers with or without additional layers.

Any suitable blocking layer or layers may be applied as one of the imaging member coatings of this invention. Typical blocking layers include gelatin (e.g. Gelatin 225, available from Knox Gelatine Inc.), and Carboset 515 (B. F. Goodrich Chemical Company) dissolved in water and methanol, polyvinyl alcohol, polyamides, gamma-aminopropyl triethoxysilane, and the like, used alone or in mixtures and blends. Blocking layers generally range in thickness of from about 0.01 micron to about 2 microns, and preferably have a thickness of from about 0.1 micron to about 1 micron. Thicknesses outside these ranges may be selected provided that the objectives of the present invention are achieved. The blocking layer may be applied with any suitable liquid carrier. Typical liquid carriers include water, methanol, isopropyl alcohol, ketones, esters, hydrocarbons, and the like.

Any suitable adhesive layer may be applied as one of the imaging member coatings of this invention. Typical adhesive layers include polyesters such as du Pont 49,000, available from E. I. du Pont de Nemours & Company, poly(2-vinylpyridine), poly(4-vinylpyridine), and the like. Adhesive layers generally range in thickness of from about 0.05 micron to about 2 microns, and preferably have a thickness of from about 0.1 micron to about 1 micron. Thicknesses outside these ranges may be selected provided that the objectives of the present invention are achieved. The adhesive layer may be applied with a suitable liquid carrier. Typical liquid carriers include methylene chloride, methanol, isopropyl alcohol, ketones, esters, hydrocarbons, and the like.

Any suitable photoconductive layer or layers may be applied as one of the imaging member coatings of this invention. The photoconductive layer or layers may contain inorganic or organic photoconductive materials. Typical inorganic photoconductive materials include well known materials such as amorphous selenium, trigonal selenium, selenium alloys, halogen-doped selenium alloys such as selenium-tellurium, selenium-tellurium-arsenic, selenium-arsenic, and the like, cadmium sulfoselenide, cadmium selenide, cadmium sulfide, zinc oxide, titanium dioxide and the like. Inorganic photoconductive materials are normally dispersed in a film forming polymer binder. Examples of suitable binders include poly(N-vinylcarbazole), polyvinylbutyral, polystyrene, phenoxy resins, polycarbonate, polyethylene terephthalate, poly N-vinylpyrrolidinone, polyvinyl alcohol, and the like. Typical organic photoconductors include phthalocyanines, quinacridones, pyrazolones, polyvinylcarbazole-2,4,7-trinitrofluorenone, anthracene and the like. Many organic photoconductor materials may also be used as particles dispersed in a resin binder. Typically, the photoconductive material is present in an amount of from about 5 to about 80 percent by weight and the binder is present in an amount of from abut 20 to about 95 percent by weight.

Any suitable multilayer photoconductors may also be employed in the imaging member of this invention. The multilayer photoconductors comprise at least two electrically operative layers, a photogenerating or charge generating layer and a charge transport layer. The charge generating layer and charge transport layer as well as the other layers may be applied in any suitable order to produce either positive or negative charging photoreceptors. For example, the charge generating layer may be applied prior to the charge transport layer as illustrated in U.S. Pat. No. 4,265,990 or the charge transport layer may be applied prior to the charge generating layer as illustrated in U.S. Pat. No. 4,346,158, the entire disclosures of these patents being incorporated herein by reference.

The photogenerating layer may comprise single or multiple layers comprising inorganic or organic compositions and the like. One example of a generator layer is described in U.S. Pat. No. 3,121,006, wherein finely divided particles of a photoconductive inorganic compound are dispersed in an electrically insulating organic resin binder. Useful binder materials disclosed therein include those which are incapable of transporting for any significant distance injected charge carriers generated by the photoconductive particles. Thus, the photoconductive particles must be in substantially contiguous particle to particle contact throughout the layer for the purpose of permitting charge dissipation required for cyclic operation. Thus, about 50 percent by volume of photoconductive particles is usually necessary in order to obtain sufficient photoconductive particle to particle contact for rapid discharge.

Examples of photogenerating layers include trigonal selenium, alloys of selenium with elements such as tellurium, arsenic, and the like, amorphous silicon, various phthalocyanine pigments such as the X-form of metal free phthalocyanine described in U.S. Pat. No. 3,357,989, metal phthalocyanines such as copper phthalocyanine, quinacridones available from du Pont under the tradename Monastral Red, Monastral violet and Monastral Red Y, substituted 2,4-diamino-triazines disclosed in U.S. Pat. No. 3,442,781, polynuclear aromatic quinones, Indofast Violet Lake B, Indofast Brilliant Scarlet and Indofast Orange. Examples of photosensitive members having at least two electrically operative layers include the charge generator layer and diamine containing transport layer members disclosed in U.S. Pat. Nos. 4,265,990; 4,233,384; 4,306,008 and 4,299,897; dyestuff generator layer and oxadiazole, pyrazalone, imidazole, bromopyrene, nitrofluourene and nitronaphthalimide derivative containing charge transport layer members disclosed in U.S. Pat. No. 3,895,944; generator layer and hydrazone containing charge transport layers members disclosed in U.S. Pat. No. 4,150,987; generator layer and a tri-aryl pyrazoline compound containing charge transport layer members disclosed in U.S. Pat. No. 3,837,851; and the like. The disclosures of these patents are incorporated herein in their entirety.

Photogenerating layers containing photoconductive compositions and/or pigments and the resinous binder material generally ranges in thickness of from about 0.1 micron to about 5.0 microns, and preferably have a thickness of from about 0.3 micron to about 1 micron. Thicknesses outside these ranges may be selected provided the objectives of the present invention are achieved. The photogenerating composition or pigment may be present in the film forming polymer binder compositions in various amounts. For example, from about 10 percent by volume to about 60 percent by volume of the photogenerating pigment may be dispersed in about 40 percent by volume to about 90 percent by volume of the film forming polymer binder composition, and preferably from about 20 percent by volume to about 30 percent by volume of the photogenerating pigment may be dispersed in about 70 percent by volume to about 80 percent by volume of the film forming polymer binder composition. The particle size of the photoconductive compositions and/or pigments should be less than the thickness of the deposited solidified layer and, more preferably between about 0.01 micron and about 0.5 micron to facilitate better coating uniformity.

Any suitable transport layer may be applied as one of the imaging member coatings of this invention to form a multilayered photoconductor. The transport layer may contain a film forming polymer binder and a charge transport material. A preferred multilayered photoconductor comprises a charge generation layer comprising a layer of photoconductive material and a contiguous charge transport layer of a polycarbonate resin material having a molecular weight of from about 20,000 to about 120,000 having dispersed therein from about 25 to about 75 percent by weight of one or more compounds having the general formula:

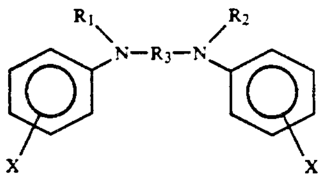

wherein $R_1$ and $R_2$ are an aromatic group selected from the group consisting of a substituted or unsubstituted phenyl group, naphthyl group, and polyphenyl group, $R_3$ is selected from the group consisting of a substituted or unsubstituted biphenyl group, diphenyl ether group, alkyl group having from 1 to 18 carbon atoms, and cycloaliphatic group having from 3 to 12 carbon atoms and X is selected from the group consisting of an alkyl group having from 1 to about 4 carbon atoms and chlorine, the photoconductive layer exhibiting the capability of photogeneration of holes and injection of the holes and the charge transport layer being substantially non-absorbing in the spectral region at which the photoconductive layer generates and injects photogenerated holes but being capable of supporting the injection of photogenerated holes from the photoconductive layer and transporting the holes through the charge transport layer. Examples of charge transporting aromatic amines including those represented by the structural formula above and others for charge transport layers capable of supporting the injection of photogenerated holes of a charge generating layer and transporting the holes through the charge transport layer include N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder. Examples of some of these transport materials are described, for example in U.S. Pat. No. 4,265,990 to Stolka et al., the entire disclosure thereof being incorporated herein by reference. Other examples of charge transport layers capable of supporting the injection of photogenerated holes of a charge generating layer and transporting the holes through the charge transport layer include triphenylmethane, bis(4-diethylamine-2-methylphenyl)-phenylmethane; 4'-4"-bis(diethylamino)-2',2"-dimethyltriphenyl methane and the like dispersed in an inactive resin binder. Numerous inactive resin materials may be employed in the charge transport layer including those described, for example, in U.S. Pat. No. 3,121,006, the entire disclosure of which is incorporated herein by reference. The resinous binder for the charge transport layer may be identical to the resinous binder material employed in the charge generating layer. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrene-butadiene copolymers, vinylidenechloride-vinylchloride copolymers, vinylacetate-vinylidenechloride copolymers, styrene-alkyd resins, and the like. These polymers may be block, random, or alternating copolymers.

Generally, the thickness of the solidified transport layer is between about 5 to about 100 microns, but thicknesses outside this range can also be used. The charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of the solidified charge transport layer to the charge generator layer is preferably maintained from about 2:1 to 200:1 and in some instances as great as 400:1.

The charge blocking layer generally has a thickness of from about 0.05 to about 5 microns. The charge blocking layer prevents charge injection from the conductive layer into the photogeneration layer and also transfers the discharged electrons into the conductive layer.

Generally, the adhesive layer is situated between the generator layer and the blocking layer, and has a thickness of from about 0.01 to about 2 microns. The adhesive layer may be selected from several known adhesives, such as PE-100, PE200, and 49000 available from E.I. du Pont de Nemours & Company, or 4-polyvinylpyridine.

If desired, the photoreceptor may also include an overcoating. Any suitable overcoating may be utilized in the fabrication of the photoreceptor of this invention. Typical overcoatings include silicone overcoatings described, for example, in U.S. Pat. No. 4,565,760, polyamide overcoatings such as Elvamide, available from E.I. du Pont de Nemours & Company, tin oxide particles dispersed in a binder described, for example, in U.S. Pat. No. 4,426,435, metallocene compounds in a binder described, for example, in U.S. Pat. No. 4,315,980, antimony-tin particles in a binder, charge transport molecules in a continuous binder phase with charge injection particles described in U.S. Pat. No. 4,515,882, polyurethane overcoatings, and the like. The disclosures of U.S. Pat. Nos. 4,565,760; 4,426,435; 4,315,980 and 4,515,882 are incorporated herein by reference in their entirety. The choice of overcoating materials would depend upon the specific photoreceptor prepared and the protective quality and electrical performance desired. Generally, any overcoatings applied have a thickness between about 0.5 micron and about 10 microns.

Any of the coating materials comprising film forming polymers may be deposited on the imaging member from solutions, dispersions, emulsions or powders by any suitable technique. However, the deposited coating should form a thin substantially uniform fluid coating on the mandrel prior to solidification of the coating. Typical techniques for depositing coatings include spray coating, dip coating, wire wound rod coating, powder coating, electrostatic spraying, sonic spraying, blade coating, and the like. If the coating is applied by spraying, spraying may be effected with or without the aid of a gas. Spraying may be assisted by mechanical and/or electrical aids such as in electrostatic spraying. Materials and process parameters are interdependent in a spray coating operation. Some of the process parameters include propellant gas pressure, solution flow rate, secondary gas nozzle pressure, gun to substrate distance, gun traversal speed and mandrel rotation rate.

Materials parameters include, for example, solvent mixtures which affect drying characteristics, the concentration of dissolved solids, the composition of the dissolved solids (e.g. monomer, polymer), and the concentration of dispersed solids when dispersions or solutions are utilized. The deposited coating should be uniform, smooth, and free from blemishes such as entrained gas bubbles and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A seamless belt comprising a laminate of poly(pyrrole) and polyvinyl fluoride was prepared as follows. An electrolyte comprising 0.10 Molar $LiClO_4$ in acetonitrile was prepared, and monomeric pyrrole was then added to the electrolyte to a concentration of 0.18 Molar. Nickel foil electrodes sectioned from seamless nickel mandrels were then cleaned in dilute (about 0.1 Molar) aqueous $H_2SO_4$ by dipping them in the acid for about 5 minutes, removing them, rinsing them first with water and then with ethanol, and drying the electrodes. Electrochemical deposition of the poly(pyrrole) onto the nickel foil electrodes was then accomplished with the current/voltage source being a three-electrode potentiostat having a nickel working electrode and a sodium saturated calomel (SSCE) reference electrode, with an auxiliary electrode of nickel. The potentiostat allowed application of a well-defined potential difference between the working and reference electrodes regardless of the magnitude of the current flow. Electrodeposition occurred at a voltage of 0.76 V vs SSCE and a current of 20 milliamperes (mA) for 2 to 3 minutes, until a uniformly dark (black) coating of poly(pyrrole) was observed. The poly(pyrrole) layer had a thickness of about 2,000 Ångstroms. A sequential wash with $CH_3CN$, $H_2O$, and ethanol to remove $LiClO_4$ followed. Polyvinyl fluoride was then deposited at this electrode at −24 V DC and 1.2 mA for 65 seconds using a low voltage DC power supply, and then coalesced at 180° C. for 5 minutes in a closed container, followed by 10 minutes at 180° C. in an open container to yield the poly(pyrrole)/polyvinyl fluoride laminate wherein the polyvinyl fluoride layer had a thickness of about 3 mils. The resistivity of the face of the belt that had contacted the electrode was 30 to 80 kΩ as measured by a high impedance digital multimeter (DMM) with probes one inch apart. This resistivity corresponds to a conductivity of from about 0.1 to about 1.7 S/cm (Siemens per centimeter or mhos per centimeter). The conductivity of the opposite face was found to be immeasurably low. An absorbance spectrum of the film between 350 nm and 800 nm was relatively flat and indicated panchromaticity and essential transparency, with an average value of 0.65 (20 percent transmission).

EXAMPLE II

Seamless belts comprising a laminate of poly(pyrrole) and polyvinyl fluoride were prepared as follows. An electrolyte comprising 0.102 Molar $LiClO_4$ in acetonitrile was prepared, and monomeric pyrrole was then added to the electrolyte to a concentration of 0.25 Molar. Electrodes consisting of electroformed nickel sleeve mandrels 3.3 inches in diameter, 3 inches long, and with an interior surface area of 198 $cm^2$ were then abraded on the interior surface, first with 600 grit paper, followed by abrasion with 000 steel wool, 3 micron diamond paste, 1 micron diamond paste, and 0.25 micron diamond paste to yield a surface with a mirror finish. The counterelectrodes were cylindrical nickel electrodes concentric with but of lesser diameter than the working electrodes. Electrochemical deposition of the poly(pyrrole) onto the nickel electrodes was then accomplished with the current/voltage source being a three-electrode potentiostat and a sodium saturated calomel (SSCE) reference electrode. Table 1 shows the applied potential, steady state current, total anodic charge collected, and polymerization time employed in the formation of the conductive polymer layer of five belts of the present invention. Poly(pyrrole) was deposited only on the interior surface of the nickel sleeve. Various poly(pyrrole) thicknesses were deposited as the total anodic charge and applied potential were varied. A sequential wash with $CH_3CN$, $H_2O$, and ethanol to remove $LiClO_4$ followed. Polyvinyl fluoride was then precipitated at the working electrodes at −24 V DC and 1.2 mA for one minute using a low voltage DC power supply, and then coalesced at 180° C. for 5 minutes in a closed container, followed by 10 minutes at 180° C. in an open container to yield the poly(pyrrole)/-polyvinyl fluoride seamless belts. A minimum thickness is associated with sufficient surface conductivity for ground plane utilization. Although the absolute value of thickness is not known, the visible absorbance of the laminate was found to be a useful gauge of thickness. Absorbance values shown in Table 1 represent the average absorbance between 350 and 800 nm, a range over which the absorption spectrum was relatively constant. Thus, a maximum transmission of 20 to 22 percent is associated with the onset of sufficient conductivity for ground plane utilization. All laminates shown in Table 1 demonstrated excellent uniformity in optical transmission over wide areas and low optical scattering characteristics as determined by visual observation, and were all conductive on the outer surface. Q indicates the charge in coulombs, and the deposition time in seconds is a function of the charge in coulombs and the current in amperes:

$$T(\text{sec}) = Q(\text{coulombs})/i(\text{Amperes})$$

Thus, for samples II-A through II-E, the deposition times were 190 seconds, 210 seconds, 200 seconds, 200 seconds, and 200 seconds, respectively. As may be seen from the extremely high resistances of II-C, II-D, and II-E, these three laminates are highly resistive, which is undesirable for ground plane applications since current must flow through this layer in an imaging member, and indicates that the poly(pyrrole) layers of these laminates are too thin. The relatively small thicknesses of the poly(pyrrole) layers obtained for samples II-C, II-D, and II-E can be attributed to the reduced amount of charge applied (10 Coulombs) during the deposition of this layer, since the thickness obtained is proportional to the charge applied.

TABLE 1

| Sample | Resistance (kΩ/□)[a] | Average Absorbance[b] | Q (coulombs) | i (mA)[c] | $E_{appl}$ vs SSCE |
|---|---|---|---|---|---|
| II-A | 10–100 | 0.83 (15%) | 15 | 80 | 0.85 |
| II-B | 15 | 2 (1%) | 47 | 220 | 0.94 |
| II-C | >20.000 | 0.54 (29%) | 10 | 50 | 0.80 |
| II-D | >20.000 | 0.63 (23%) | 10 | 50 | 0.75 |

TABLE 1-continued

| Sample | Resistance (kΩ/□)[a] | Average Absorbance[b] | Q (coulombs) | i (mA)[c] | $E_{appl}$ vs SSCE |
|---|---|---|---|---|---|
| II-E | >20,000 | 0.51 (31%) | 10 | 50 | 0.72 |

[a]Measured by a digital voltmeter with a probe separation of one inch
[b]Values of percent transmittance in parentheses
[c]Maximum steady state current

EXAMPLE III

A bilayer laminate of poly(pyrrole) and polyvinyl fluoride was prepared as follows. An electrolyte comprising 0.92 Molar $NaClO_4$ in acetonitrile was prepared, and monomeric pyrrole was then added to the electrolyte to a concentration of 0.25 Molar. An electrode consisting of an electroformed nickel sleeve mandrel 3.3 inches in diameter, 3 inches long, and with an interior surface area of 198 $cm^2$ was then immersed for about ½ hour in a bath containing a 1:1 mixture of 30 percent by weight hydrogen peroxide in water and 30 percent ammonium hydroxide in water. The counterelectrode was a cylindrical nickel electrode concentric with, but of lesser diameter than, the working electrode. Electrochemical deposition of the poly(pyrrole) onto the nickel electrode was then accomplished with the current/voltage source being a three-electrode potentiostat and a sodium saturated calomel (SSCE) reference electrode. The applied voltage was about 0.80 volt vs SSCE for about 2.5 minutes. Washes with $CH_3CN$ and ethanol to remove $NaClO_4$ from the poly(pyrrole) layer thus formed followed, yielding a poly(pyrrole) layer with a thickness of about 1,000 Ångstroms.

Polyvinyl fluoride was then electrophoretically deposited from a suspension of the polymer in a propylene carbonate/methanol solution (57/10 v/v) at a solids concentration of about 33 percent by volume. Deposition occurred at the working electrode (cathode) at −24 volts and over a range of 30 to 70 mA for about 6 minutes to yield a uniform coating of the uncured polymer on the electrode surface. Subsequently, the polyvinyl fluoride was coalesced at 180° C. for 5 minutes in a closed container, followed by 10 minutes at 180° C. in an open container to yield a semitransparent poly(pyrrole)/polyvinyl fluoride seamless belt wherein the polyvinyl fluoride layer had a thickness of about 3 mils, with the outer surface of the belt being conductive and exhibiting a conductivity of about $6.8\times10^4$ Ω/□ and the inner surface of the belt being nonconductive and exhibiting an immeasurably high resistance (>20MΩ/□). A visible-near IR spectrum of the laminate indicated that the material possesses sufficient panchromaticity to be suitable as an electrophotographic ground plane in imaging members sensitive to visible or infrared light.

EXAMPLE IV

A bilayer laminate of poly(pyrrole) and polyvinylidene fluoride was prepared as follows. A layer of poly(-pyrrole) was electrochemically deposited onto a working electrode as described in Example III. Subsequently, polyvinylidene fluoride was electrophoretically deposited from a suspension of the polymer in a propylene carbonate/methanol solution (57/10 v/v) at a solids concentration of about 15 percent by weight. Deposition occurred at the working electrode (anode) at +90 volts and about 4 mA for about 4 minutes to yield a uniform coating of the uncured polymer on the electrode surface. Subsequently, the polyvinylidene fluoride was coalesced by heating the electrode to about 180° C. for about 20 minutes to yield a semitransparent poly(pyrrole)/polyvinylidene fluoride seamless belt with a conductive outer surface exhibiting a conductivity of $5\times10^4$ Ω/□. The thickness of the poly(pyrrole) layer was about 5,000 Ångstroms and the thickness of the polyvinylidene fluoride layer was about 4 mils. The belt was cut open and tested by electrically grounding the poly(pyrrole) side and corona charging the polyvinylidene fluoride surface. The surface voltage of this surface was measured less than one second after charging. The belt was charged to 1100 volts, with a corona charging density of about $3.8\times10^{-9}$ coulombs per square centimeter. Surface voltage decay was slow (less than 40 volts per second) after charging. Charge-voltage data indicated that this bilayer laminate is suitable as an ionographic receiver ground plane.

EXAMPLE V

A bilayer laminate of poly(pyrrole) and poly(amide-imide) was prepared as follows. A layer of poly(pyrrole) was electrochemically deposited onto a working electrode as described in Example III. Subsequently, poly(amide-imide), commercially available from Amoco as Torlon 4000TF was electrophoretically deposited from a suspension prepared by slowly adding a solution of about 1.01 grams of the polymer in 100 milliliters of 1-methyl-2-pyrrolidinone at room temperature (about 25° C.) to 300 milliliters of $CH_3CN$ at 55° C. with vigorous stirring. Deposition occurred at the working electrode (anode) at +20 volts and about 2.0 mA for 12 minutes and then at 40 volts and 4 mA for 38 minutes to yield a uniform coating of the uncured polymer on the electrode surface. Subsequently, the poly(amide-imide) was allowed to air dry for about 10 minutes, followed by heating the electrode to about 110° C. for 80 minutes to yield a semitransparent poly(pyrrole)/poly(amide-imide) seamless belt with a conductive outer surface exhibiting a conductivity of $3\times10^5$ Ω/□. The thickness of the poly(pyrrole) layer was about 2000 Ångstroms and the thickness of the poly(amide-imide) layer was about 3 mils. A visible-near IR spectrum of the laminate indicated that the material possesses sufficient panchromaticity to be suitable as an electrophotographic ground plane in imaging members sensitive to visible or infrared light.

EXAMPLE VI

An electrophotographic imaging member was prepared by cutting open the seamless belt prepared in Example III and hand coating additional layers onto the conductive polymer surface in the following order. A blocking layer with a thickness of 0.8 millimeter comprising a methacrylate polymer was prepared by dissolving the polymer in Dowanol PM solvent, available from Dow Chemical Company, at 8 weight percent concentration, and coating the solution onto the poly(-pyrrole) surface with a draw bar of 0.5 mil gap. Subsequently, an adhesive layer comprising poly(4-vinylpyridine), available from Reilly Tar and Chemical Company, was prepared by dissolving 0.12 gram of the polymer in 17.9 grams of isobutano; and 2 grams of isopropanol and coating the solution onto the blocking layer surface with a draw bar of 0.5 mil gap. A photogenerating layer with a thickness of 1 micron comprising 28.4 weight percent of trigonal selenium, 55.3 weight percent of poly(N-vinylcarbazole), and 16.3 weight percent of N,N'-diphenyl-N,N'-bis(3-methylphenyl)-[1,1'- biphenyl]-4,4'-diamine was prepared by dissolving 8.57 grams of trigonal selenium, 16.72 grams of poly(N-vinylcarbazole), and 4.93 grams of the diamine into 100.6 grams of tetrahydrofuran and 100.6 grams of toluene and coating the solution onto the poly(4-vinyl pyridine) surface with a draw bar of 0.5 mil gap. Finally, a charge transport layer with a thickness of 25 to 30 microns comprising a mixture of 40 percent by weight of N,N'-diphenyl-N,N'-bis(3-methylphenyl)-[1,1'-biphenyl]-4,4'-diamine and 60 percent by weight of bisphenol-A-polycarbonate, commercially available from Mobay Chemical Company as Makrolon®, was prepared by dissolving 2.8 grams of the diamine and 4.2 grams of the bisphenol-A-polycarbonate in 40 grams of methylene chloride and coating the solution onto the selenium surface with a draw bar of 0.5 mil gap. The table below indicates the electrical cycling behavior of this device when charged by corona charging at a charge density of 140 nanocoulombs per square centimeter. The surface potential of the entire device was measured by a capacitatively coupled voltage probe. Charge acceptance was measured 0.19 second after charging. Residual voltage was measured after the device was exposed to a white light tungsten erase lamp.

| Cycles | Charge Acceptance (volts) | Residual voltage (volts) |
|---|---|---|
| 1 | 1220 | 40 |
| 10 | 1200 | 50 |
| 300 | 1160 | 45 |
| 1000 | 1100 | 45 |

Excellent charge acceptance of about 1200 volts and excellent residual voltage of 40 to 50 volts were observed. It is believed that these cycling characteristics are attributable to the lack of trapping within the bulk of each layer and at each interface, including the poly(pyrrole)/blocking layer interface. After 24 hours of rest, the device then exhibited the following electrical characteristics:

| Cycles | Charge Acceptance (volts) | Residual voltage (volts) |
|---|---|---|
| 1 | 1040 | 45 |
| 200 | 1100 | — |

As shown, the device retained its excellent electrical characteristics after 24 hours of rest. These data illustrate the desirability of the bilayer laminates of the present invention as supporting substrate/ground plane layers in imaging members.

EXAMPLE VII

An electroreceptor suitable for ionographic imaging as disclosed in U.S. Pat. Nos. 4,524,371 and 4,463,363, the disclosure of each of these patents being totally incorporated herein by reference, was prepared by the process of Example IV, wherein a bilayer laminate comprising poly(pyrrole) and polyvinylidene fluoride is formed, with the exception that deposition of both layers was on the outside surface of the working electrode, with the counterelectrode being concentric with and of larger diameter than the working electrode, resulting in a seamless conductive belt with the conductive layer on the inside surface. The nonconductive (polyvinylidene fluoride) surface of the laminate was then charged to 1200 volts by corona discharge, after which it exhibited a dark decay of about 13.6 volts per second. When charged positively, the laminate exhibited a dielectric constant of from about 18 to about 20, and when charged negatively, it exhibited a dielectric constant of from about 20 to about 24, as calculated by determining the slope of a voltage vs. charge plot obtained with the poly(pyrrole) layer grounded. These data indicate that the laminates of the present invention are suitable as imaging members for ionographic imaging applications.

Other embodiments and modifications of the present invention may occur to those skilled in the art subsequent to a review of the information presented herein; these embodiments and modifications, as well as equivalents thereof, are also included within the scope of this invention.

What is claimed is:

1. An imaging member comprising a substrate and a photogenerating layer, wherein the substrate comprises a laminate of a conducting polymer layer and a host polymer layer, wherein the surface of the conducting polymer layer exhibits a conductivity of from about $10^2$ to about $10^6$ ohms per square, and wherein the conducting polymer is selected from the group consisting of poly(pyrrole), poly(alkylpyrroles), poly(2,5-thienylene), polyalkylthienylenes, poly(2,2'-bithiophene), and polyaniline.

2. An imaging member according to claim 1 wherein the conducting polymer is poly(pyrrole).

3. An imaging member according to claim 1 wherein the host polymer is selected from the group consisting of chloro substituted polyvinyl compounds, bromo substituted polyvinyl compounds, fluoro substituted polyvinyl compounds, polycarbonates, polyesters, polyarylates, polyarylsulfones, polyether sulfones, polyimides, epoxies, poly(amide-imides), copolyesters, polyarylethers, and mixtures thereof.

4. An imaging member according to claim 1 wherein the host polymer is selected from the group consisting of polyvinyl fluoride, polyvinylidene fluoride, polyvinyl chloride, polyimides, and poly(amide-imides).

5. An imaging member according to claim 1 wherein the conducting polymer layer has a thickness of from about 200 Ångstroms to about 1 micron.

6. An imaging member according to claim 1 wherein the host polymer layer has a thickness of from about 1 mil to about 4 mils.

7. An imaging member according to claim 1 wherein the photogenerating layer comprises a material selected from the group consisting of selenium, alloys of selenium, phthalocyanine pigments, quinacridones, substituted 2,4-diamino-triazines, polynuclear aromatic quinones, amorphous silicon, and hydrogenated amorphous silicon.

8. An imaging member according to claim 1 wherein the photogenerating layer comprises a material selected from the group consisting of amorphous selenium, trigonal selenium, alloys of selenium and tellurium, alloys of selenium and arsenic, alloys of selenium, tellurium, and arsenic, metal free phthalocyanine pigments, and metal phthalocyanine pigments.

9. An imaging member according to claim 1 wherein the imaging member contains a charge transport layer.

10. An imaging member according to claim 9 wherein the photogenerating layer is situated between the substrate and the charge transport layer.

11. An imaging member according to claim 9 wherein the charge transport layer is situated between the substrate and the photogenerating layer.

12. An imaging member according to claim 9 wherein the charge transport layer comprises a material of the formula

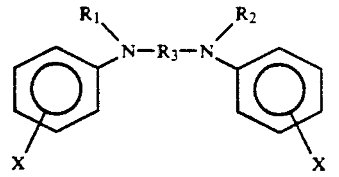

wherein $R_1$ and $R_2$ are aromatic groups independently selected from the group consisting of phenyl, substituted phenyl groups, naphthyl, and polyphenyl; $R_3$ is selected from the group consisting of biphenyl, substituted biphenyl groups, diphenyl ether, alkyl groups having from 1 to about 18 carbon atoms, and cycloaliphatic groups having from about 3 to about 12 carbon atoms; and X is selected from the group consisting of chlorine and alkyl groups having from 1 to about 4 carbon atoms.

13. An imaging member according to claim 1 wherein the imaging member contains a charge blocking layer.

14. An imaging member according to claim 13 wherein the charge blocking layer is situated between the substrate and the photogenerating layer.

15. An imaging member according to claim 1 wherein the imaging member contains an adhesive layer.

16. An imaging member according to claim 1 which comprises, in the order stated, the substrate, a charge blocking layer, an adhesive layer, the photogenerating layer, and a charge transport layer.

17. An imaging member according to claim 1 wherein the imaging member contains an overcoating layer.

18. An imaging member according to claim 16 wherein the imaging member contains an overcoating layer.

19. A process for preparing an electrophotographic imaging member which comprises:

a. preparing a seamless belt comprising a laminate of a conducting polymer layer and a host polymer layer by
   (i) preparing a solution comprising a nonaqueous solvent, an electrolyte, and monomers that will. upon polymerization, result in a conductive polymer;
   (ii) adding the solution to a cell containing a working electrode, a counterelectrode, and a reference electrode;
   (iii) effecting anodic oxidation and polymerization of the monomers by applying a potential to the working electrode and counterelectrode until a layer of conductive polymeric material has been deposited on the working electrode;
   (iv) preparing a dispersion comprising a liquid dispersion medium and a host polymer capable of becoming electrostatically charged in the liquid dispersion medium;
   (v) adding the dispersion to a cell comprising a working electrode upon which has been electrochemically deposited a layer of a conductive polymer and a counterelectrode;
   (vi) effecting electrophoretic deposition of the host polymer onto the working electrode by applying a potential to the working electrode and counterelectrode until a layer of the host polymer has been deposited on the conductive polymer present on the working electrode;
   (vii) subsequently heating the working electrode, thereby resulting in a two-layer laminate of the conductive polymeric material and the host polymer; and
   (viii) removing the laminate from the electrode; and b. coating onto the seamless belt a layer of a photogenerating material.

* * * * *